US010013712B2

(12) United States Patent
Dugaw et al.

(10) Patent No.: US 10,013,712 B2
(45) Date of Patent: *Jul. 3, 2018

(54) ACCESS TO GUEST ACCOUNTS IN ELECTRONIC COMMERCE

(71) Applicant: Amazon Technologies, Inc., Reno, NV (US)

(72) Inventors: John Ingram Baker Dugaw, Covington, WA (US); Sarah McIlwain, Seattle, WA (US); Bruce K. Ferry, Seattle, WA (US); Julian Sell, Seattle, WA (US)

( * ) Notice: Subject to any disclaimer, the term of this patent is extended or adjusted under 35 U.S.C. 154(b) by 484 days.

This patent is subject to a terminal disclaimer.

(21) Appl. No.: 14/268,203

(22) Filed: May 2, 2014

(65) Prior Publication Data
US 2014/0244434 A1 Aug. 28, 2014

Related U.S. Application Data

(63) Continuation of application No. 12/473,737, filed on May 28, 2009, now Pat. No. 8,719,108.

(51) Int. Cl.
*G06Q 30/06* (2012.01)

(52) U.S. Cl.
CPC ..... *G06Q 30/0633* (2013.01); *G06Q 30/0601* (2013.01)

(58) Field of Classification Search
CPC . G06Q 30/06; G06Q 30/0601; G06Q 30/0222
See application file for complete search history.

(56) References Cited

U.S. PATENT DOCUMENTS

| | | | | |
|---|---|---|---|---|
| 7,328,176 B2* | 2/2008 | Tarvydas | ............... | G06Q 30/06 705/26.62 |
| 7,672,288 B1* | 3/2010 | Iartym | ............. | H04L 29/12216 370/349 |
| 7,680,696 B1* | 3/2010 | Murray | ............... | G06Q 10/087 705/26.4 |
| 7,680,969 B1 | 3/2010 | Murray | | |
| 8,271,320 B2* | 9/2012 | Agrawal | ............... | G06Q 30/02 705/14.1 |
| 8,417,219 B2* | 4/2013 | Hahn | .................... | H04L 63/08 455/411 |
| 2001/0029472 A1* | 10/2001 | Hataguchi | ............. | G06Q 30/06 705/26.42 |
| 2002/0007318 A1* | 1/2002 | Alnwick | ............. | G06Q 10/087 705/27.1 |
| 2002/0022967 A1* | 2/2002 | Ohkado | ................. | G06Q 10/08 705/26.1 |
| 2003/0065562 A1* | 4/2003 | Matsui | .................. | G06Q 30/02 705/14.49 |

(Continued)

*Primary Examiner* — Talia F Crawley
*Assistant Examiner* — Talia Crawley

(57) ABSTRACT

Disclosed are various embodiments involving access to guest orders in an electronic commerce application. In one embodiment, a request to access a guest account is obtained from a client. The request specifies a destination network address and an order identifier. A message is sent to the destination network address in response to verifying that the destination network address and the order identifier are associated with the guest account. The message includes a link that facilitates access to an order management function for the guest account.

20 Claims, 5 Drawing Sheets

(56) References Cited

U.S. PATENT DOCUMENTS

| | | | | |
|---|---|---|---|---|
| 2003/0101128 A1* | 5/2003 | Abernethy | ............ | G06Q 40/04 |
| | | | | 705/37 |
| 2004/0068443 A1* | 4/2004 | Hopson | ................. | G06Q 10/02 |
| | | | | 705/5 |
| 2005/0228680 A1* | 10/2005 | Malik | ..................... | G06F 21/33 |
| | | | | 709/206 |
| 2005/0228723 A1* | 10/2005 | Malik | ..................... | G06F 21/33 |
| | | | | 705/26.1 |
| 2007/0022015 A1* | 1/2007 | Tarinelli | ................ | G06Q 10/02 |
| | | | | 705/5 |
| 2008/0262920 A1* | 10/2008 | O'Neill | ................. | G06Q 30/02 |
| | | | | 705/14.27 |
| 2009/0064346 A1* | 3/2009 | Larsson | ............. | H04L 63/0807 |
| | | | | 726/29 |
| 2009/0182686 A1* | 7/2009 | Miles | ..................... | G06Q 40/00 |
| | | | | 705/36 R |
| 2013/0263286 A1* | 10/2013 | Aillery | .................... | G06F 21/31 |
| | | | | 726/28 |

* cited by examiner

Enter Order Number

To view or modify an order placed as a guest, please enter your order number along with the email address you used to place your order. The order number (for "Order ID") is a 17-digit code which can be found in your order confirmation email.

Order Number: [_____] ―183  (Example: XXX-XXXXX-XXX)

Email Address: [_____] ―186

We will generate a secure link and send it to the email address associated with the order. This secure link will be valid for 10 minutes after it is generated. Please check your email promptly and access the secure link to gain access to your order. If you are unable to access the email within 10 minutes, then return to this page to re-enter your order number and email address to generate a new secure link.

Confirm Your Order Number

For security purposes, please confirm your order number by entering it below.

Order Number: [_____] ―193  (Example: XXX-XXXXX-XXX)

Order Summary
Order Number: 12345678990
Order Placed: January 1, 2009
Number of Shipments for Order: 3

| Shipment 1 | | | | |
|---|---|---|---|---|
| Order Status: Not yet shipped  — 206  [ Edit ] — 209   [ Cancel ] — 213 /203 | | | | |
| Delivery Estimate: January 8, 2009 | | | | |
| Shipping Address: | Item: | Quantity: | Unit Price: | Item Total: |
| John Q. Public | Widget | 1 | $34.99 | $34.99 |
| 12345 Main Street | Size: Large | | | |
| New Falls, Ohio 45678 | Color: Red | | | |
| USA | | | | |
| Shipping Type: | Item: | Quantity: | Unit Price: | Item Total: |
| Standard Shipping | Widget Adaptor | 1 | $4.00 | $4.00 |

/—203

| Shipment 2  /—206 | | | | /—216 |
|---|---|---|---|---|
| Order Status: Shipped on January 3, 2009 via Allied Parcel Service | | | | [ Track Your Package ] |
| Delivery Estimate: January 5, 2009 | | | | |
| Shipping Address: | Item: | Quantity: | Unit Price: | Item Total: |
| John Q. Public | Widgetizer | 1 | $15.23 | $15.23 |
| 12345 Main Street | | | | |
| New Falls, Ohio 45678 | | | | |
| USA | | | | |
| Shipping Type: | | | | |
| Standard Shipping | | | | |

/—223

| Payment Information | |
|---|---|
| Payment Method: | Item(s) Subtotal: $54.22 |
| Credit Card (Last 4 Digits: 4567) | Promotion Applied: -$10.00 |
| Billing Address: | Shipping & Handling: $4.32 |
| John Q. Public | Before Tax Total: $48.54 |
| 12345 Main Street | Sales Tax: $2.91 |
| New Falls, Ohio 45678 | |
| USA | Total for this Shipment: $51.45 |

If you have any questions regarding this order, please contact Customer Service at (123) 456-7890. Please have your order number available when calling.

ACCESS TO GUEST ACCOUNTS IN ELECTRONIC COMMERCE

CROSS-REFERENCE TO RELATED APPLICATIONS

This application is a continuation of, and claims priority to, co-pending U.S. Patent Application entitled "ACCESS TO GUEST ACCOUNTS IN ELECTRONIC COMMERCE," filed on May 28, 2009, and assigned application Ser. No. 12/473,737, which is incorporated herein by reference in its entirety.

BACKGROUND

Many people are unwilling to purchase items from online merchants due to the fact that they may be required to provide personal financial information to the merchant that will then be maintained in an account. As a consequence, online merchants are essentially unable to sell their products to such people, thereby limiting their sales potential.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2 is a drawing of one example of a user interface generated on a display device of a client in the data communications network of FIG. 1 according to an embodiment of the present disclosure.

FIG. 3 is a drawing of an example of another user interface generated on a display device of a client in the data communications network of FIG. 1 according to an embodiment of the present disclosure.

FIG. 4 is a drawing of an example of still another user interface generated on a display device of a client in the data communications network of FIG. 1 according to an embodiment of the present disclosure.

DETAILED DESCRIPTION

The following discussion describes systems and methods relating to providing access to order information associated with guest orders generated in an electronic commerce environment according to various embodiments. Such guest orders are typically generated without establishing a user account with the online merchant as will be described. For the sake of convenience, first a data communications network 100 is described, followed by a discussion of the operation of the various components of the data communications network 100 according to various embodiments.

Figure 1:
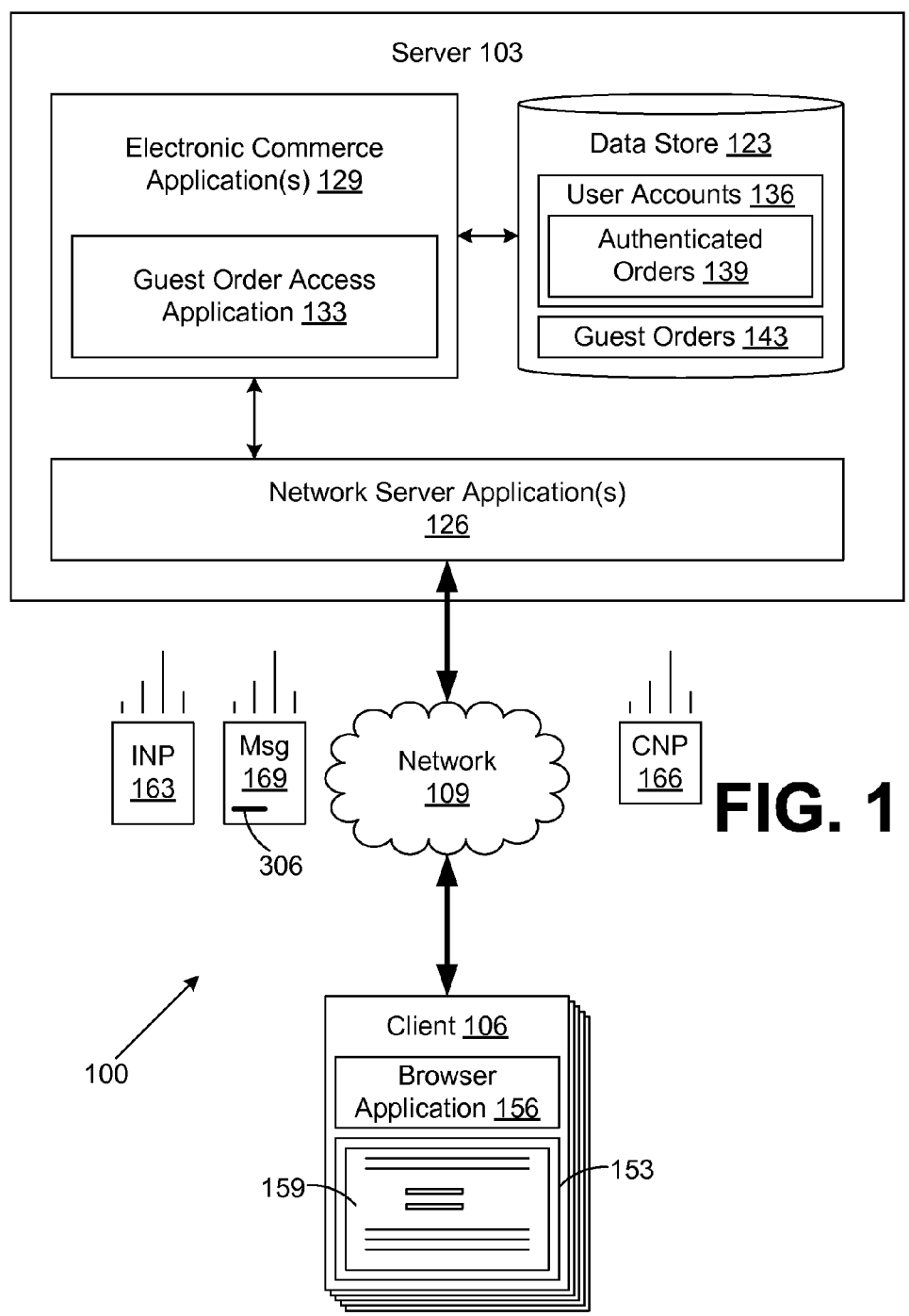
FIG. 1 is a drawing of a data communications network according to various embodiments of the present disclosure.

With reference to FIG. 1, shown is an example of a data communications network 100 that includes a server 103 and one or more clients 106 that are coupled to a network 109. The network 109 may comprise, for example, the Internet, intranets, extranets, wide area networks (WANs), local area networks (LANs), wired networks, wireless networks, or other suitable networks, etc., or any combination of two or more such networks. For purposes of convenience, the server 103 and client(s) 106 are referred to herein in the singular. However, it is understood that in one embodiment, the server 103 may represent a plurality of servers, and the client 106 may represent a plurality of clients.

The server 103 is employed to execute various applications that provide for the network presence of online merchants as will be described. As contemplated herein, the terms "network presence" refer to the online existence of an online merchant through which products may be sold by the online merchant. To this end, a "network presence" may be viewed as a network portal or structure through which an online merchant can sell products. Such a portal may comprise, for example, a network site such as a website like those found on the Internet such as EBAY™, GOOGLE™, YAHOO™, or other online merchants. In addition, the products sold through the network presence of online merchants may comprise goods and/or services.

The server 103 may comprise, for example, a server computer or like system. The server 103 may represent multiple servers arranged, for example, in one or more server banks or other arrangements. Such servers may be located in a single installation or may be dispersed among many different geographical locations. To this end, a server 103 may be viewed as a server "cloud" that represents the computing capacity of multiple servers, etc.

Various applications and data are executed or stored in the server 103 according to various embodiments. The data associated with the operation of the various applications described below may be stored in a data store 123 as can be appreciated. The applications executed on the server 103 include various network server applications 126 and an electronic commerce application 129. The network server applications 126 may comprise, for example, web servers or other types of network server applications 126 that provide browser access or other appropriate types of access to clients 106 and the like using various protocols such as the transmission control protocol/Internet Protocol (TCP/IP). The electronic commerce application 129 facilitates the network presence of an online merchant. According to one embodiment, the electronic commerce applications 129 facilitate the creation of orders for products as a product of interaction with a client 106 over a network 109.

Stored within the data store 123 is all of the data that is necessary for the electronic commerce application 129 to conduct commercial transactions through the network presence of an online merchant. To this end, such data includes user accounts 136, authenticated orders 139, guest orders 143, and other data. The authenticated orders 139 are generated by purchasers for which a user account 136 is maintained in the data store 123. To this end, such purchasers are typically authenticated with at least a username and password before access to the data in their user account 136 is provided. The guest orders 143 are generated by guest purchasers for which no user account 136 is maintained. As contemplated herein, a "user account" 136 comprises data associated with a given purchaser that facilitates at least one commercial transaction between a merchant and the purchaser.

Alternatively, the so called "guest order" 143 is generated by a guest purchaser for which no user account 136 is maintained by the online merchant. To this end, the purchaser who originates a guest order 143 is deemed a guest purchaser as there is no user account 136 maintained for the purchaser. To this end, the guest purchaser is required to enter their information such as shipping address, payment instrument information, and other information for each guest order 143 submitted as such information is not maintained in a corresponding user account 136 for the guest purchaser. Once a guest order 143 is created, from time to time a corresponding guest purchaser may wish to access the information associated with the guest order 143 to make changes or to cancel the guest order 143 altogether before it is shipped. To this end, the electronic commerce application 129 includes a guest order access application 133 that facilitates such access as will be described.

Each of the guest orders 143 are stored in the data store 123 in isolation with respect to the user accounts 136. This means that there is no association drawn between any one of the guest orders 143 and any one of the user accounts 136. Also, each of the guest orders 143 is stored in isolation with respect to other ones of the guest orders 143. That is to say, the data associated with each guest order 143 is self-contained and is complete in and of itself. No data associated with any two or more guest orders 143 is stored in a common location such as a user account 136. Thus, if a guest purchaser wishes to access order information associated with two or more guest orders 143 that are currently being fulfilled, such a guest purchaser would need to access each guest order 143 individually in a manner as will be described.

Further, the data associated with guest orders 143 is not maintained in the data store 123 except as needed to implement the fulfillment of the guest order 143 and as may be required by applicable statutes and/or other laws that govern online commercial transactions.

The client 106 is representative of a plurality of client devices coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. The client 106 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include a display device 153, indicator lights, speakers, etc. The display device 153 may comprise, for example, cathode ray tubes (CRTs), liquid crystal display (LCD) screens, gas plasma-based flat panel displays, LCD projectors, or other types of display devices, etc.

Executed within the client 106 are various applications including a browser application 156. The browser application 156 is configured to interact with the electronic commerce application 129 and other applications on the server 103 through the network server applications 126 according to an appropriate protocol such as the Internet Protocol Suite comprising Transmission Control Protocol/Internet Protocol (TCP/IP) or other protocols. To this end, the browser application 156 may comprise, for example, a commercially available browser such as INTERNET EXPLORER™ sold by Microsoft Corporation of Redmond, Wash., or MOZILLA FIREFOX™ which is promulgated by Mozilla Corporation of Mountain View, Calif., or other type of browser. Alternatively, the browser application 156 may comprise some other application with like capability. When executed in the client 106, the browser application 156 renders network pages that include various user interfaces 159 for display.

The guest order access application 133 may serve up various network pages and send messages to the client 106 during the process of establishing access to the content of a guest order 143 for a guest purchaser. During this process, the guest order access application 133 may send various network pages such as an input page 163 and a confirmation network page 166 in response to various requests from the client 106. The guest order access application 133 also sends an electronic message 169 having a link 173 included therein to the client 106 as will be described.

Next, a general discussion of the operation of the various components of the data communications network 100 is provided. To begin, the electronic commerce application 129 facilitates the generation of guest orders 143 for the purchase of products by guest purchasers. To this end, the electronic commerce application 129 serves up multiple network pages that facilitate the input of needed information to generate guest orders 143. Such information may comprise, for example, identity information, billing address, shipping address, payment instrument information, and any other needed data.

Ultimately, after a guest order 143 is generated, the same is stored in the data store 123 as described above. The guest order 143 is stored in the data store 123 in isolation with respect to the user accounts 136, and in isolation with respect to the other guest orders 143 stored in the data store 123.

Once a guest order 143 has been created, then it may take a short period of time before the guest order 143 is actually fulfilled. To this end, various fulfillment capabilities may be employed to ship an ordered product to a customer in fulfillment of the guest order 143. Such fulfillment resources may comprise, for example, fulfillment centers, warehouses, and/or other materials handling centers.

Given that a period of time exists between the time that the guest order 143 is created and the time it is fulfilled, then it is possible that changes may be made to the guest order 143 before fulfillment. For example, it may be the case that a guest purchaser may wish to reduce the quantity of a product purchased, cancel the guest order 143, or make other changes as can be appreciated.

According to one embodiment, the guest order access application 133 provides client access to order data associated with one or more guest orders 143 to facilitate an action to be taken by a guest purchaser with respect to the guest order 143. The action taken may comprise editing the pending guest order 143 before it is fulfilled, canceling the guest order, or other action. According to one embodiment, the access that is provided to a guest order 143 limits the different types of actions that may be taken by a guest purchaser with respect to a guest order 143 so as to prevent or minimize fraud or other problems as will be described.

In one example, the customer actions that may be taken with respect to a guest order 143 are restricted to a set of potential actions that do not result in an increase in an original purchase price that was associated with the guest order 143. This is to prevent unscrupulous individuals from accessing the guest order 143 after stealing the necessary order information from the guest purchaser and increasing the products subject to the guest order 143, thereby increasing the price. In such case, a guest purchaser could never be charged more than the original amount owed at the time that the guest order 143 was originated, thereby minimizing the losses due to potential fraud.

In order to provide access to a guest order 143 for a guest purchaser, the guest purchaser first executes the browser application 156 and accesses appropriate network pages of an online merchant to request access to a guest order 143. Such a request is transmitted to the network server applications 126 and ultimately is received and processed by the guest order access application 133 as part of the electronic commerce applications 129. In response to the request, a further input network page 163 may be served up to the requesting client 106 that obtains input from the guest purchaser. The input network page 163 is displayed on a display device 153 of the client 106 to facilitate the input of information that uniquely identifies the guest order 143 stored in the data store 123. In one example, such information may comprise, for example, an order number or other information.

In addition, the input network page 163 also facilitates the input of a network delivery address of a guest purchaser associated with the guest order 143. The network delivery address may comprise, for example, any address information that allows a message 169 to be sent thereto so that the guest purchaser can access the message 169. Thus, the network delivery address may comprise an e-mail address, an SMS address (i.e., a telephone number), or other type of address to which an electronic message 169 may be transmitted. Alternatively, other information may be requested such as confirmation numbers, physical addresses, answers to security questions, or other information. The input network page 163 may be configured to require the information entered to conform with predefined conventions to prevent errors.

Once the requested information is entered into appropriate fields or other components of the input network page 163, the guest purchaser may cause the client 106 to send such information to the server 103. In response, the server 103 first checks to see that the input information is valid (i.e., formatted correctly) and that the input information such as an order number actually corresponds to one of the guest orders 143 stored in the data store 123.

Also, the guest order access application 133 determines whether the network destination address received from the client 106 is associated with one of the user accounts 136. To this end, if the destination address and order number are associated with a respective one of the user accounts 136, then the guest order access application 133 may cause a login network page (not shown) to be sent to the client 106 that facilitates a user login to the respective user account 136. This prevents a purchaser who holds a user account 136 from purchasing products as a guest purchaser or accessing orders created under a user account as a guest purchaser.

For example, where a guest purchaser attempts to access guest orders 143 that were created before a user account 136 was established for the guest purchaser, then the guest order access application 133 may allow the user to access only the guest orders 143 as a guest purchaser. In this embodiment, a user would not be allowed to access orders created under a user account as a guest purchaser. Thus, if both an order number and destination network address are entered that are associated with an order created under a user account, the user may be presented with an appropriate login page through which their account may be accessed. If the order number entered with a destination network address is associated with a guest order and the destination network address is associated with both guest orders 143 and orders generated under a user account, then the purchaser may be provided access to only the guest order 143 as a guest purchaser as described herein. Where a destination network address entered by a purchaser is only associated with orders generated under a user account, the purchaser may be presented with a login page to facilitate access through the user account as guest access to such orders would be improper.

Assuming that the login network page that facilitates access to a user account is sent to the client 106, the purchaser may be required to enter login information such as, for example, a user name and password or other login information to access their user account 136 through which they should be able to access the orders associated with their user account 136. This prevents a purchaser who holds a user account 136 in the data store 123 from attempting to access an authenticated order 139 associated with their user account 136 through a guest order access process.

Assuming that the guest order access application 133 receives the network delivery address, order number, or other information from the client 106 and the order number and network delivery address are associated with a guest order 143, then a message 169 containing a link 173 to a confirmation network page 166 is sent to the network delivery address. The confirmation network page 166 is served up by the guest order access application 133 as part of the electronic commerce applications 129. The confirmation network page 166 may comprise, for example, a user interface 159 that is rendered on the display device 153 to facilitate confirmation of the information previously entered for the guest order 143. In one example, the confirmation network page 166 requests a user to re-input the order number or other information associated with the guest order 143 to which they desire to gain access.

The confirmation network page 166 is generated upon receiving an indication in the server 103 from a client 106 that the guest purchaser clicked on or otherwise manipulated the link 173 in the message 169. Once this indication is received, then the guest order access application 133 is configured to proceed to generate and send the confirmation network page 166 to the client 106.

According to one embodiment, the link 173 that was included in the message 169 transmitted to the network delivery address described above is valid for a predefined period of time. That is to say, when the guest order access application 133 sends the message 169 including the link 173 to the respective delivery address, the guest order access application 133 begins tracking a predefined period of time within which the link 173 is valid. To this end, the guest order access application 133 may set a timer or other component that is employed to track the passing of a predefined period of time that occurs after the message 169 is sent to the delivery address.

In one embodiment, a guest purchaser must manipulate the link 173 to send the request to the server 103 for the confirmation network page 166 while the link 173 is valid in order for the guest order access application 133 to actually serve up the confirmation network page 166. Assuming that a user manipulates the link 173 in the message 169 before the predefined period of time has passed, then the guest order access application 133 responds by generating the confirmation network page 166 and sending the same to the client 106. Alternatively, if the indication that the user has manipulated the link 173 in the message 169 is received at the server 103 after the passing of the predefined period of time, then the guest order access application 133 sends an error message to the client 106 indicating that the link 173 is no longer valid.

Thus, when the message 169 is sent to the network delivery address with a link 173 to the confirmation network page 166, a guest purchaser has a limited amount of time within which they must access the message 169 through an electronic mail (email) system or other system and manipulate the link 173 before it is invalid. This ensures that the link 173 is not valid for an extended period of time so as to minimize the possibility of fraud in cases where unscrupulous individuals may illicitly gain access to the link 173.

In cases where a guest purchaser is unable to access the message 169 in order to manipulate the link 173 in time before the link 173 becomes invalid, then the user may start the process anew by accessing the original input network page 163 to input the delivery address, order number, and/or other information as described above.

Upon receiving the confirmation network page 166, the guest purchaser may enter appropriate information such as the order number or other information in order to further authenticate the guest purchaser. A timer may be employed to track whether the guest purchaser enters information through the confirmation network page 166. If the timer expires without action by the user, then the session may be canceled and the guest purchaser will be required to start the process once more to gain access to the order.

Assuming that the appropriate information is entered into the confirmation network page 166, then a guest order summary page is served up to the client 106 that indicates the order information and facilitates editing the order. An inactivity timeout period may be associated with the guest order summary page to ensure that it is not accessed by unscrupulous individuals that might make unwanted changes to the guest order in the absence of the quest purchaser.

With the foregoing in mind, reference is made to FIG. 2 which shows an example of a user interface 159 (FIG. 1), denoted herein as user interface 159*a*, according to various embodiments of the present disclosure. In one embodiment, the user interface 159*a* may be embodied in the input network page 163. As shown, the user interface 159*a* instructs the user to enter required information. This may be accomplished by using various input fields such as, for example, an order number input field 183 and an address input field 186. Alternatively, input fields may be provided to input other types of information. The input fields 183 and 186 are listed along with instructions to enter such information and indicate that the guest purchaser would have a limited amount of time to check their email account or other message delivery system to open the message 169 and manipulate the link 173 to the confirmation network page 166 as described above.

With reference to FIG. 3, shown is another user interface 159 denoted herein as user interface 159*b* according to various embodiments of the present disclosure. The user interface 159*b* provides for the re-entry of information entered in the user interface 159*a* (FIG. 1). The user interface 159*b* may be embodied in the confirmation network page 166 (FIG. 1) described above. The user interface 159*b* is downloaded to the client 106 (FIG. 1) in response to a manipulation of the link 173 (FIG. 1) included in the message 169 (FIG. 1) transmitted from the server 103 (FIG. 1) as described above. According to one embodiment, the user interface 159*b* includes an order number input field 193. Alternatively, the guest purchaser may be required to enter other information in order to confirm the desire to access the guest order 143 (FIG. 1).

By virtue of the fact that the message 169 with the link 173 is sent to the given destination network address associated with the guest purchaser, the possibility of fraud is minimized. This is the case as the guest purchaser will have a limited time within which they must access the message 169 and click the link 173 included therein to ultimately gain access to the confirmation network page 166 to confirm information entered and to confirm that they are in fact the guest purchaser associated with the guest order 143 to be accessed.

Also, given the fact that the message 169 is sent to a specific destination address, then the possibility of third parties obtaining access to the guest order 143 is minimized as the message 169 containing the link 173 is only transmitted to the specified destination address and the link 173 is only valid for a predefined period of time. The fact that the link 173 is only valid for a predefined period of time prevents another user from accessing the email system or other messaging system of a guest purchaser and subsequently clicking on the link 173 to gain access to the guest order 143 in order to make unauthorized changes thereto long after the link 173 would normally have expired.

Referring next then to FIG. 4, shown is a user interface 159 (FIG. 1) which is denoted herein as user interface 159*c* according to various embodiments of the present disclosure. The user interface 159*c* depicts an order summary of a guest order 143 (FIG. 1). A guest order 143 may be fulfilled by sending multiple shipments, where different products or groups of products associated with the guest order 143 may be shipped to the guest purchaser at different times. Also, it is possible that a guest purchaser may specify different shipping addresses for respective items associated with a given guest order 143.

To this end, the user interface 159*c* lists the order number and the date the guest order 143 was placed. Also, the user interface 159*c* includes shipment boxes 203 that list each product that is included in a given shipment. Each shipment may include an order status 206. The order status 206 may comprise, for example, "not yet shipped," "in process," "shipped," or some other status. To the extent that the status of one or more products subject to a guest order 143 is "not yet shipped" as indicated in a respective shipment box 203, then it may be possible to make changes to the guest order 143 as it sets forth information regarding those products.

In order to facilitate changes to a given shipment expressed in a shipment box 203, various components such as an "edit" button 209 and a "cancel" button 213 are included in the shipment box 203. The edit button 209 may be clicked on or otherwise manipulated so as to allow a user to edit the guest order 143 with respect to the products listed in the shipment box 203. In response, one or more subsequent network pages may be served up to the client 106 that facilitate changing various parameters such as the size, color, or some other aspect of a product that is subject to the guest order 143 as listed in the shipment box 203. Alternatively, the guest purchaser may also change the shipping address, the shipping type to be employed to transport the items to the shipping address, and other aspects of the shipment depicted.

However, in some embodiments, it may not be possible for the guest purchaser to change the shipping address so as to avoid the occurrence of fraud. In addition, according to one embodiment, the guest purchaser is prevented from making a change to a quantity of any one of the products associated with the shipment box 203, for example, that results in an increase in the shipment or guest order price. By enforcing this rule, the price associated with a guest order 143 is prevented from increasing beyond that which was originally specified when the guest order 143 was created.

Nonetheless, one may be allowed to delete products from the guest order 143, thereby resulting in a reduction of price. In addition, the cancel button 213 may be manipulated to cancel the portion of the guest order 143 indicated in the shipment box 203 in which the cancel button 213 appears.

In some situations, the shipment identified by shipment box 203 may be "in process" or "shipped." In such cases, fulfillment centers or other materials handling centers may have already started the process of fulfilling a guest order 143 such that the process cannot be reversed. In such case, a user is prevented from making any edits to the guest order 143 by virtue of the fact that the edit buttons 209 and the cancel buttons 213 are not included in the respective shipping box 203. However, it should be noted that shipments may be subject to other status beyond "not yet shipped," "in process," and "shipped." Also, certain fulfillment centers or other materials handling facilities may operate so as to allow an individual to cancel a guest order 143 until it actually has shipped out the door or perhaps even while products are in transit on the way to the shipping address with an appropriate carrier.

In addition, when a shipment is actually shipped, the user interface 159c may include a "track your package" button 216 that allows a user to track the progress of the package in transit. To this end, the track your package button 216 may actuate a link to the network site of a carrier that can provide the status of the shipment at any given time. Alternatively, the track your package button 216 may cause a subsequent network page to be downloaded that facilitates the entry of a shipment number and other information needed in order to obtain a status of a product in transit. In one embodiment, the electronic commerce application 129 may interact with the servers of a carrier to obtain the shipment information to be presented to a user as can be appreciated. In addition, the user interface 159c includes a payment information box 223 that lists the payment information as well as the monetary totals for the guest order 143 depicted in the user interface 159c.

Beyond those described above, the various actions that a guest purchaser can take with respect to a given guest order 143 include changing gift options such as whether a purchased product is to be gift wrapped, or to include, delete, or edit a gift message associated with the purchased product. In addition, a shipping type may be changed such that a product is shipped to a guest purchaser via a faster (i.e. overnight) or slower (regular post) shipping option that is currently specified. Also, a guest purchaser might wish to change a payment method or a billing address, etc. Still further, a promotion that did not exist when a guest order was created might be retroactively applied to the guest order by a guest purchaser through one or more further network pages. In addition, there may be other actions that a guest purchaser may be allowed to take with respect to a given guest order.

By virtue of the fact that the user can make the changes to the guest order 143 as described above, then fewer calls to a customer service operation will be made in order to make such changes for guest orders 143. In addition, an inactivity timeout may be associated with the user interface 159c to minimize an occurrence of fraud.

Figure 5:
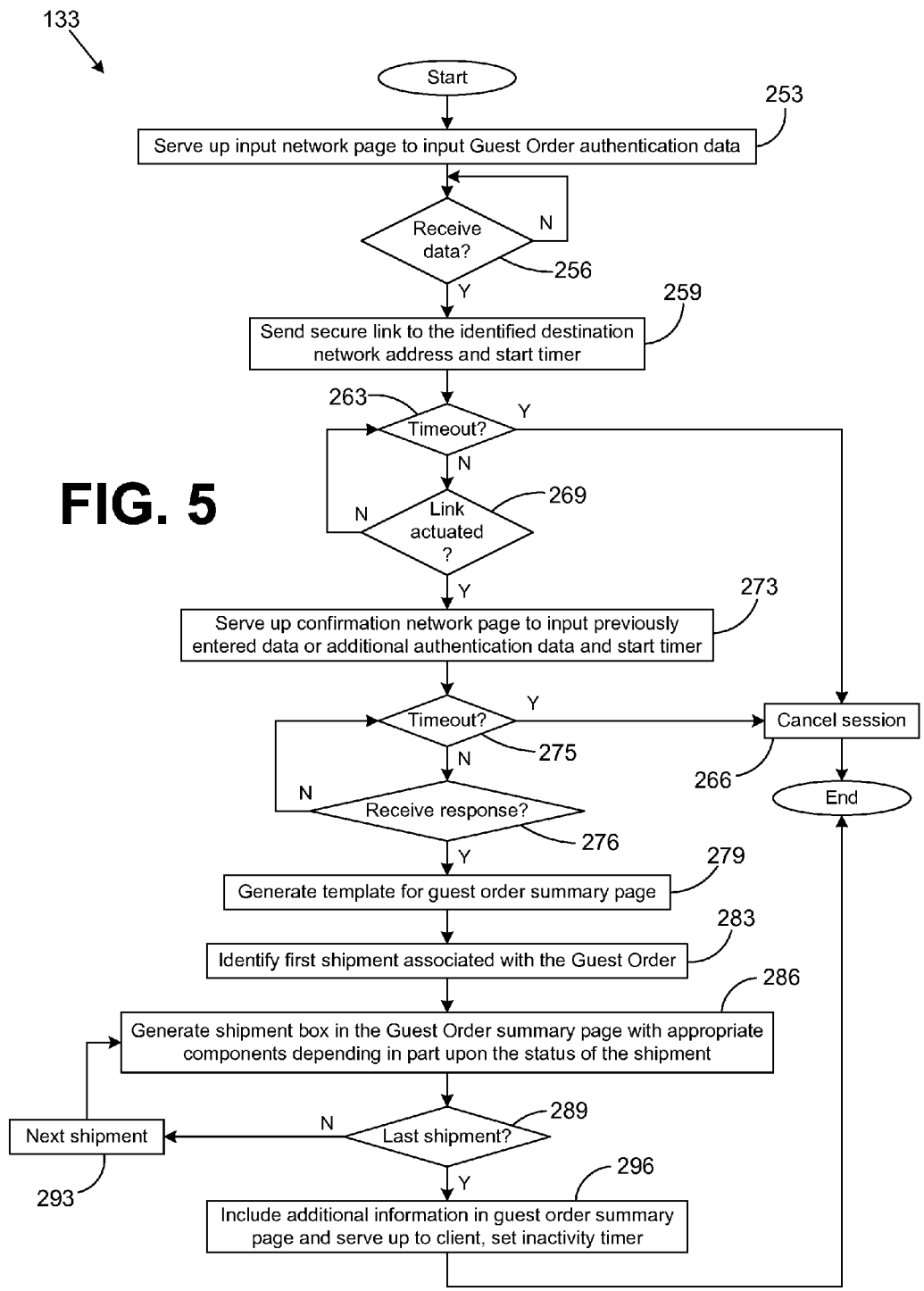
FIG. 5 is a flowchart that illustrates one example of functionality implemented as a portion of an electronic commerce application implemented in a server in the data communications network of FIG. 1 according to an embodiment of the present disclosure.

With reference to FIG. 5, shown is a flowchart that provides one example of functionality of the guest order access application 133 according to the various embodiments of the present disclosure. Alternatively, the flowchart of FIG. 1 may be viewed as depicting methods of a step implemented in the server 103 as can be appreciated. The flowchart illustrates examples of specific functionality implemented in the server 103 in order to provide access to information associated with a guest order 143 generated by the electronic commerce application 129 as described above.

To begin, in box 253, the guest order access application 133 serves up the input network page 163 to the client 106 to facilitate an input of information needed to provide access to a guest order 143 for the respective guest purchaser. To this end, the network page may embody, for example, the user interface 159a and may present other information as can be appreciated. In box 256, the guest order access application 133 waits to receive the authentication data entered such as, for example, the order number and destination network address entered into the order number input field 183 (FIG. 2) and address input field 186 (FIG. 2) as described above. If such information is not received within a given period of time, then the operation of the guest order access application 133 may be aborted and the transaction is cancelled.

Assuming that such information is received in box 256, then in box 259, a secure link 173 is sent in a message 169 to the destination network address specified by the guest purchaser. Also, the timer that tracks the limited period of time to receive a response from the guest purchaser is started.

Before the message 169 with the secure link 173 is sent, the guest order access application 133 may check to see if a guest order 143 exists for the destination network address entered. To this end, it may be the case that an individual (1) has only created guest orders 143, (2) has created guest orders 143 prior to establishing a user account and creating orders in association with the user account, or (3) only has orders created through a user account and, according to one embodiment, should not be allowed to access such orders as a guest purchaser. In the first scenario, the logic would proceed to facilitate access to the guest orders 143. In the second scenario, the logic would proceed to provide access to the guest orders 143 only and would not be able to access any orders associated with a user account. In the third scenario, a user would be presented with a login page to access their user account and they would not be allowed to access orders created under a user account as a guest purchaser. In addition, other approaches may be employed in this respect.

Next, in box 263, assuming that the message 169 with the secure link 173 was sent to the destination network address, the guest order access application 133 determines whether the time period tracked by the timer has passed. If so, then the link 173 has become invalid. In such a case, the guest order access application 133 proceeds to box 266 in which the session is canceled. If the user clicks on the link 173 after the time period expires, then an appropriate network page is generated that indicates that the link 173 has expired.

However, if the time period has not expired in box 263 then the guest order access application 133 progresses to box 269. In box 269, the guest order access application 133 determines whether an indication that the link 173 was actuated has been received. Such an indication may be embodied in a message 169 from the client 106 (FIG. 1) that indicates that the link 173 in the message 169 has been manipulated. Assuming that such a response is received in box 269, then the guest order access application 133 proceeds to box 273. Otherwise, it reverts back to box 263 as shown.

In box 273 the guest order access application 133 serves up the confirmation network page 166 (FIG. 1) in response to the manipulation of the link 173 in the message 169 and starts a validity timer to track a timeout period associated with the confirmation network page 166. The confirmation network page 166 facilitates the reentry of data or the entry of new additional data to further authenticate the user with respect to the guest order 143. In box 275, the guest order access application 133 determines whether the timeout period associated with the confirmation network page 166 has expired. If so, then the guest order access application 133 proceeds to box 266 described above to cancel the session. To this end, the confirmation network page 166 is deemed valid for a predefined period of time within which the user needs to enter the requested information. In box 276, the guest order access application 133 determines whether an appropriate response has been received from the client 106 that includes the entered information to further authenticate the guest purchaser. Assuming that the response is received in box 276, then the guest order access application 133 progresses to box 279. Otherwise, the guest order access application 133 reverts back to box 275.

In box 279, a template or other appropriate data structure is accessed or generated for the guest order summary network page that is to be populated with data so as to ultimately disclose the information as was described above, for example, with the user interface 159c (FIG. 4). Such a template may be dynamically constructed using various network page components and other data as can be appreciated. Then, in box 283, a first shipment associated with the guest order 143 in question is identified. Thereafter, in box 286, a shipment box 203 may be generated in the guest order summary network page that includes appropriate components that facilitate various user actions with respect to the guest order 143 depending at least in part upon the status of the respective shipment as described above.

The components may comprise, for example, the edit button 209 (FIG. 4), the cancel button 213 (FIG. 4), the track your package button 216 (FIG. 4) and other components as can be appreciated. Thereafter, in box 289, the guest order access application 133 determines whether the last shipment associated with the guest order 143 has been noted in the guest order summary network page. If not, then the guest order access application 133 reverts back to box 293 to designate the next shipment to be represented in the guest order summary network page. Thereafter, the guest order access application 133 reverts to box 286.

Assuming that the last shipment has been addressed in box 289, then the guest order access application 133 proceeds to box 296 to add any further information to the guest order summary network page such as payment information, etc., before serving up the guest order summary network page to the client 106. Also, an inactivity timer associated with the guest order summary network page is initiated that prevents any edits to the guest order through the guest order summary network page if no activity is detected for the inactivity period. This prevents fraud by minimizing the possibility that an unscrupulous individual may gain access to the guest order summary network page in the absence of the guest purchaser. The inactivity timer may track a time period of appropriate length such as, for example, 15 minutes or other time period. Thereafter, the guest order access application 133 ends as shown.

In addition, it is understood that other functionality may be included in the guest order access application 133 beyond that described above to facilitate the various capabilities described herein.

Figure 6:
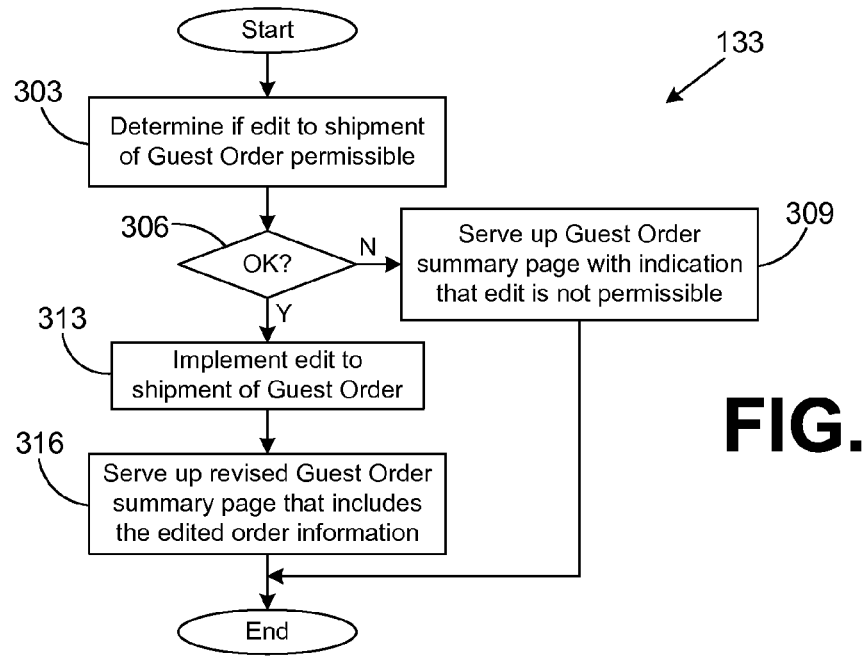
FIG. 6 is a flowchart that illustrates another example of functionality implemented as a portion of an electronic commerce application implemented in a server in the data communications network of FIG. 1 according to an embodiment of the present disclosure.

With reference next to FIG. 6, shown is a flowchart that depicts an example of additional functionality of the guest order access application 133 according to further embodiments of the present disclosure. Alternatively, the flowchart of FIG. 6 may be viewed as steps of a method implemented in the server 103 according to various embodiments. The functionality of the guest order access application 133 as depicted in FIG. 6 is presented as an alternative embodiment in which changes to shipments are allowed if they are deemed permissible based at least in part upon a number of predefined rules.

For example, a rule may be created that states that no price of a guest order 143 can increase by virtue of an edit made by a guest purchaser. Such may occur, for example, if the quantity of products subject to a guest order 143 is increased, or if an item is eliminated that triggered special pricing such as a two-for-one deal. In addition, there may be many other types of changes that ultimately result in an increase in the price. In addition, a rule may be created that allows certain price increases within a given range, percentage of the original purchase price, or based on some other condition.

To begin, in box 303, the guest order access application 133 determines whether a desired potential change received from a client 106 is permissible based at least in part upon a predefined set of rules. To this end, one or more user interfaces 159 (FIG. 1) may be presented during the course of facilitating an edit of a guest order 143 to present respective information to facilitate the editing of the guest order 143. Thereafter, in box 306, if the guest order access application 133 determines that the edit is not permissible, then the guest order access application 133 proceeds to box 309. Otherwise, the guest order access application 133 progresses to box 313. In box 309, further guest order summary network pages or other network pages are served up to the client 106 that include an indication that the desired edit was not permissible. Thereafter, the guest order access application 133 ends as shown.

An edit to a guest order may be deemed permissible depending upon the rules that are applied. For example, as mentioned above, a rule may dictate that the ultimate purchase price associated with a guest order cannot increase over the original purchase price, over a certain percentage higher than the original purchase price, or over some other threshold. In some cases, canceling a product may nullify the effect of a promotion, thereby resulting in an increase in price even though fewer items are purchased.

However, assuming that the guest order access application 133 progresses to box 313, then the desired edit is implemented and the guest order 143 is changed accordingly. Then, in box 316, a revised guest order summary network page is served up to the client 106 that includes the edited guest order information. Thereafter, the guest order access application 133 ends as shown.

Figure 7:
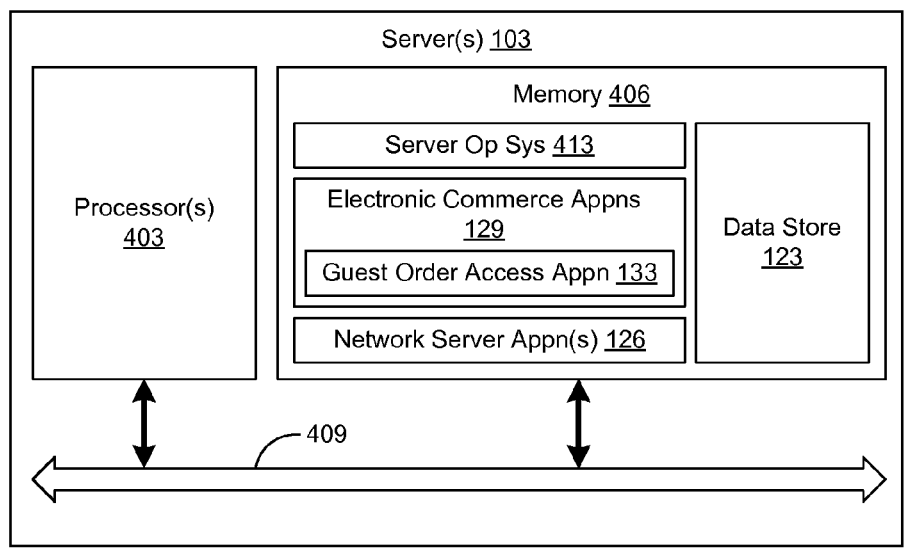
FIG. 7 is a schematic block diagram that illustrates one example of a server employed in the data communications network of FIG. 1 according to an embodiment of the present disclosure.

Referring next to FIG. 7 shown is a schematic block diagram of one example of the server 103 according to an embodiment of the present disclosure. The server 103 includes at least one processor circuit, for example, having a processor 403 and a memory 406, both of which are coupled to a local interface 409. To this end, the server 103 may comprise, for example, a server computer or like device. The local interface 409 may comprise, for example, a data bus with an accompanying address/control bus or other bus structure as can be appreciated.

Stored in the memory 406 are both data and several components and/or applications that are executable by the processor 403. In particular, stored in the memory 406 and executable by the processor 403 are a server operating system 413, the electronic commerce application(s) 129, the guest order access application 133, and the network server application(s) 126, and potentially other applications.

Also, stored in the memory 406 is the data store 123 in which is stored the various data items described above so as to be accessible to the processor 403. It is understood that there may be other applications that are stored in the memory 406 and are executable by the processor 403 as can be appreciated. Also, other data may be stored in the memory 406 and accessed by the processors 403 beyond the data items described above.

A number of software components are stored in the memory 406 and are executable or executed by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories etc. The local interface 409 may comprise additional systems designed to coordinate this communication, including, for example, performing load balancing. The processor 403 may be of electrical or of some other available construction.

The various applications, network pages, and other components described above may be implemented using any one or more of a number of programming languages such as, for example, C, C++, C#, Visual Basic, VBScript, Java, JavaScript, Perl, Ruby, Python, Flash, Hypertext Markup Language (HTML), Extensible Markup Language (XML), or other programming languages.

Although the various applications described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5 and 6 show examples of the functionality and operation of an implementation of the various applications described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications described herein comprise software or code, each can be embodied in any computer-readable medium for use by or in connection with an instruction execution system such as, for example, a processor in a computer system or other system. In this sense, the applications may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing specific instructions that, when executed, cause at least one computing device to at least:
    generate a guest order for a purchase of an item based at least in part on interaction with another computing device;
    generate a network page facilitating an input of a destination network address and an identifier of the guest order;
    send the network page to the other computing device;
    send a message to the destination network address in response to receiving the destination network address and the identifier of the guest order from the other computing device;
    authenticate the other computing device based at least in part on a manipulation of a link in the message via the other computing device; and
    provide the authenticated other computing device with access to guest order data associated with the guest order to facilitate at least one customer action with respect to the guest order.

2. The non-transitory computer-readable medium of claim 1, wherein the guest order data is stored in isolation with respect to a plurality of user accounts stored in a data store.

3. The non-transitory computer-readable medium of claim 1, wherein the guest order data is stored in isolation with respect to order data corresponding to a plurality of other guest orders stored in a data store.

4. The non-transitory computer-readable medium of claim 1, wherein the specific instructions, when executed, further cause the at least one computing device to at least verify that the link was manipulated within a predefined time period.

5. The non-transitory computer-readable medium of claim 1, wherein the specific instructions, when executed, further cause the at least one computing device to at least:
    generate a confirmation user interface configured to elicit the identifier of the guest order;
    send data encoding the confirmation user interface to the other computing device in response to the manipulation of the link; and
    authenticate the other computing device in response to receiving the identifier of the guest order from the other computing device via the confirmation user interface.

6. The non-transitory computer-readable medium of claim 5, wherein the specific instructions, when executed, further cause the at least one computing device to at least verify that the identifier of the guest order was received from the other computing device via the confirmation user interface within a predefined time period.

7. A system comprising:
    a data store configured to store guest order data; and
    at least one computing device in communication with the data store, the at least one computing device configured to at least:
    generate a network page facilitating an input of a request to access a guest account;
    send the network page to another computing device;
    receive the request to access the guest account from the other computing device, the request specifying a destination network address and an order identifier; and
    send a message to the destination network address in response to verifying that the destination network address and the order identifier are associated with the guest account, the message including a link that facilitates access to at least one order management function for the guest account.

8. The system of claim 7, wherein the at least one order management function includes at least one of cancelling an order associated with the guest account or making a change to the order.

9. The system of claim 7, wherein the at least one order management function includes making a change to an order and wherein the at least one computing device is further configured to at least reject the change to the order in response to determining that the change would increase an order price of the order.

10. The system of claim 7, wherein the guest account is unassociated with a password.

11. The system of claim 7, wherein the guest account is associated with a single order corresponding to the order identifier.

12. The system of claim 7, wherein the link is valid for a predefined time period.

13. The system of claim 7, wherein the at least one computing device is further configured to at least send data encoding a confirmation user interface to the other computing device in response to a manipulation of the link at the other computing device, the confirmation user interface eliciting the order identifier.

14. The system of claim 13, wherein the at least one computing device is further configured to at least maintain a validity timer associated with the confirmation user interface, the validity timer indicating a time period for which a response via the confirmation user interface is valid.

15. The system of claim 13, wherein the at least one computing device is further configured to at least send data encoding an order management user interface to the other computing device in response to receiving the order identifier from the other computing device via the confirmation user interface, the order management user interface including at least one component configured to perform the at least one order management function.

16. A computer-implemented method comprising:

sending, via at least one computing device, data encoding an input interface to another computing device, the input interface facilitating an input of a guest order access request;

receiving, via the at least one computing device, the guest order access request from the other computing device, the guest order access request specifying an order identifier and a destination network address;

verifying, via the at least one computing device, that the order identifier and the destination network address are associated with a guest order;

in response to verifying that the order identifier and the destination network address are associated with the guest order, sending, via the at least one computing device, a message to the destination network address, the message specifying a link configured to request a confirmation user interface;

sending, via the at least one computing device, data encoding the confirmation user interface to the other computing device in response to a manipulation of the link via the other computing device; and authenticating, via the at least one computing device, the other computing device for management of the guest order in response to receiving the order identifier via the confirmation user interface.

17. The computer-implemented method of claim 16, further comprising in response to authenticating the other computing device for management of the guest order, sending, via the at least one computing device, data encoding a guest order management user interface to the other computing device, the guest order management user interface configured to present information summarizing the guest order.

18. The computer-implemented method of claim 16, wherein the guest order is stored in a data store in isolation from a plurality of other guest orders stored in the data store.

19. The computer-implemented method of claim 18, wherein the guest order and at least one other guest order of the plurality of other guest orders were generated by a single purchaser.

20. The computer-implemented method of claim 16, further comprising:

receiving, via the at least one computing device, an order modification request from the other computing device after the other computing device is authenticated for management of the guest order;

determining, via the at least one computing device, whether implementation of the order modification request would increase an order price of the guest order beyond an original order price; and rejecting, via the at least one computing device, the order modification request when the implementation of the order modification request would increase the order price of the guest order beyond the original order price.

* * * * *